US010114904B2

(12) United States Patent
Liu et al.

(10) Patent No.: US 10,114,904 B2
(45) Date of Patent: Oct. 30, 2018

(54) METHOD, SYSTEM, ELECTRONIC DEVICE AND SERVER FOR SYNCHRONOUS DISPLAY OF OPERATING INFORMATION

(71) Applicant: WISTRON CORPORATION, New Taipei (TW)

(72) Inventors: Jin-Wei Liu, New Taipei (TW); Hui Deng, New Taipei (TW); Jin-Guang Wan, New Taipei (TW)

(73) Assignee: Wistron Corporation, New Taipei (TW)

( * ) Notice: Subject to any disclaimer, the term of this patent is extended or adjusted under 35 U.S.C. 154(b) by 148 days.

(21) Appl. No.: 14/556,982

(22) Filed: Dec. 1, 2014

(65) Prior Publication Data

US 2015/0286738 A1 Oct. 8, 2015

(30) Foreign Application Priority Data

Apr. 2, 2014 (CN) .......................... 2014 1 0130774

(51) Int. Cl.
*G06F 17/30* (2006.01)
*H04L 29/08* (2006.01)

(52) U.S. Cl.
CPC .. *G06F 17/30893* (2013.01); *G06F 17/30905* (2013.01); *H04L 67/02* (2013.01)

(58) Field of Classification Search
CPC .............................................. G06F 17/30893
USPC ........................................................ 715/234
See application file for complete search history.

(56) References Cited

U.S. PATENT DOCUMENTS

| | | | |
|---|---|---|---|
| 7,237,002 B1 * | 6/2007 | Estrada | G06F 17/30873 |
| | | | 707/999.01 |
| 8,508,478 B2 | 8/2013 | West et al. | |
| 2007/0273695 A1 * | 11/2007 | Stevens | G06Q 10/10 |
| | | | 345/441 |

(Continued)

FOREIGN PATENT DOCUMENTS

| | | |
|---|---|---|
| CN | 103188334 | 7/2013 |
| TW | 200901033 A | 1/2009 |
| TW | 201228286 A1 | 7/2012 |

OTHER PUBLICATIONS

The Office Action issued to Taiwanese Counterpart Application No. 103113029 by the Taiwan Intellectual Property Office dated Jun. 29, 2015 along with an English translation of sections boxed in red.

(Continued)

*Primary Examiner* — Stephen S Hong
*Assistant Examiner* — Hope C Sheffield
(74) *Attorney, Agent, or Firm* — JCIPRNET (57) ABSTRACT

A method for synchronous display of operating information includes the steps of: receiving a request from a first device for access to a file stored in a server; providing the file to the first device and a second devices, contents of the file being displayed on each of the first and second devices in a form of a web page using a respective web browser launched thereby; receiving, from the first device, operating information that is associated with an input operation performed upon the web page of the first device; and relaying the operating information to the second device. The operating information is used to display an indicator associated therewith on the web page of the second device.

17 Claims, 7 Drawing Sheets

(56) References Cited

U.S. PATENT DOCUMENTS

| | | | |
|---|---|---|---|
| 2008/0301713 A1* | 12/2008 | Demarest | G06Q 10/10 719/317 |
| 2008/0313545 A1 | 12/2008 | Patel et al. | |
| 2009/0249222 A1* | 10/2009 | Schmidt | H04N 21/2368 715/751 |
| 2011/0252339 A1* | 10/2011 | Lemonik | G06F 17/2288 715/753 |

OTHER PUBLICATIONS

"Office Action of China Counterpart Application," dated Oct. 16, 2017, p. 1-p. 13.

* cited by examiner

METHOD, SYSTEM, ELECTRONIC DEVICE AND SERVER FOR SYNCHRONOUS DISPLAY OF OPERATING INFORMATION

CROSS-REFERENCE TO RELATED APPLICATION

This application claims priority of Chinese Patent Application No. 201410130774.6, filed on Apr. 2, 2014, the entire disclosure of which is incorporated herein by reference.

BACKGROUND OF THE INVENTION

1. Field of the Invention

The invention relates to method for display of operating information, more particularly to a method, a system, an electronic device, and a server for synchronous display of operating information.

2. Description of the Related Art

A conventional computer is capable of implementing synchronous display of image frames which are being displayed by the computer on other electronic devices, such as another computer, a projector or a digital television, by means of an application program of an operating system run by the computer, for example, a synchronous video conference program or a multiple output display program. However, a conventional way to share image frames of the computer is usually carried out in a manner that an image of a whole display screen of the computer is shared. Therefore, when the display screen of the computer contains image contents desired to be shared and image contents which are preferred to be withheld, the image contents preferred to be withheld are inevitably displayed on other electronic devices together with the image contents desired to be shared. Moreover, since the other electronic devices are shared with the image frames of the whole display screen of the computer, only the image frames from the computer are displayed at one time, and no further image frames from other electronic devices may be shared at the same time.

SUMMARY OF THE INVENTION

Therefore, an object of the present invention is to provide a method and a system for synchronous display of operating information, and electronic devices and a server implementing the same method. By means of a web browser, multiple electronic devices are able to share contents of a plurality of files, as well as operating information associated with the contents of the files at the same time.

In a first aspect of the present invention, a method is adapted for synchronous display of operating information. The method is to be implemented by a server communicatively coupled to a first electronic device and to at least one second electronic device. The method comprises:

(A) receiving, by the server, a request from the first electronic device for access to a file stored in the server;
(B) providing, by the server, the file which is requested by the first electronic device to each of the first electronic device and said at least one second electronic device, contents of the file being displayed on each of the first and second electronic devices in a form of a web page using a respective web browser launched by each of the first and second electronic devices;
(C) receiving, by the server, from the first electronic device, operating information associated with an input operation performed upon the web page of the contents of the file displayed by the web browser of the first electronic device; and
(D) relaying, by the server, the operating information received from the first electronic device to said at least one second electronic device, the operating information configuring the second electronic device to display an indicator associated with the operating information on the web page of the contents of the file displayed by the web browser of the second electronic device.

In a second aspect of the present invention, a system is adapted for synchronous display of operating information. The system comprises a first electronic device, at least one second electronic device, and a server. The server is communicatively coupled to the first and second electronic devices. The server receives a request from the first electronic device for access to a file stored in the server. The server provides the file which is requested by the first electronic device to each of the first electronic device and said at least one second electronic device. Contents of the file are displayed on each of the first and second electronic devices in a form of a web page using a respective web browser launched by each of the first and second electronic devices. The server receives, from the first electronic device, operating information that is associated with an input operation performed upon the web page of the contents of the file displayed by the web browser of the first electronic device. The server relays the operating information received from the first electronic device to said at least one second electronic device. The operating information configures the second electronic device to display an indicator that is associated with the operating information on the web page of the contents of the file displayed by the web browser of the second electronic device.

In a third aspect of the present invention, an electronic device is adapted for enabling synchronous display of operating information of the electronic device, via a server, on a remote electronic device communicatively coupled to the server. The electronic device comprises a communication unit, a display unit, and a processor unit. The communication unit establishes communication with the server. The processor unit sends, via the communication unit, a request to the server for access to a file stored in the server. The processor unit receives the file which is requested by the electronic device from the server. The processor unit displays contents of the file on the display unit in a form of a web page using a web browser launched by the processor unit, and enables the server to provide the file to the remote electronic device such that the contents of the file are displayed on the remote electronic device in a form of a web page using a web browser launched by the remote electronic device. The processor unit obtains operating information that is associated with an input operation performed upon the web page of the contents of the file displayed by the web browser of the electronic device, and transmits the operating information via the communication unit to the server such that the operating information is relayed by the server to the remote electronic device. The operating information configures the remote electronic device to display an indicator associated with the operating information on the web page of the contents of the file displayed by the web browser of the remote electronic device.

In a fourth aspect of the present invention, an electronic device is communicatively coupled to a server. The electronic device comprises a communication unit, a display unit, and a processor unit. The communication unit establishes communication with the server, and receives a file and operating information provided by the server. The processor unit displays contents of the file on the display unit in a form of a web page using a web browser launched by the processor unit, and displays an indicator that is associated with the operating information on the web page of the contents of the file displayed by the web browser of the electronic device.

In a fifth aspect of the present invention, a server is communicatively coupled to a first electronic device and to at least one second electronic device. The server comprises a storage unit, a communication unit, and a processor unit. The storage unit stores at least one file. The communication unit establishes communication with the first electronic device and said at least one second electronic device. The processor unit receives a request from the first electronic device for access to the file stored in the storage unit. The processor unit provides, via the communication unit, the file which is requested by the first electronic device to each of the first electronic device and said at least one second electronic device. Contents of the file are displayed on each of the first and second electronic devices in a form of a web page using a respective web browser launched by each of the first and second electronic devices. The processor unit receives, from the first electronic device, operating information that is associated with an input operation performed upon the web page of the contents of the file displayed by the web browser of the first electronic device. The processor unit relays the operating information received from the first electronic device to said at least one second electronic device. The operating information configures the second electronic device to display an indicator associated with the operating information on the web page of the contents of the file displayed by the web browser of the second electronic device.

BRIEF DESCRIPTION OF THE DRAWINGS

Other features and advantages of the present invention will become apparent in the following detailed description of an embodiment with reference to the accompanying drawings, of which.

DETAILED DESCRIPTION OF THE EMBODIMENT

Figure 1:
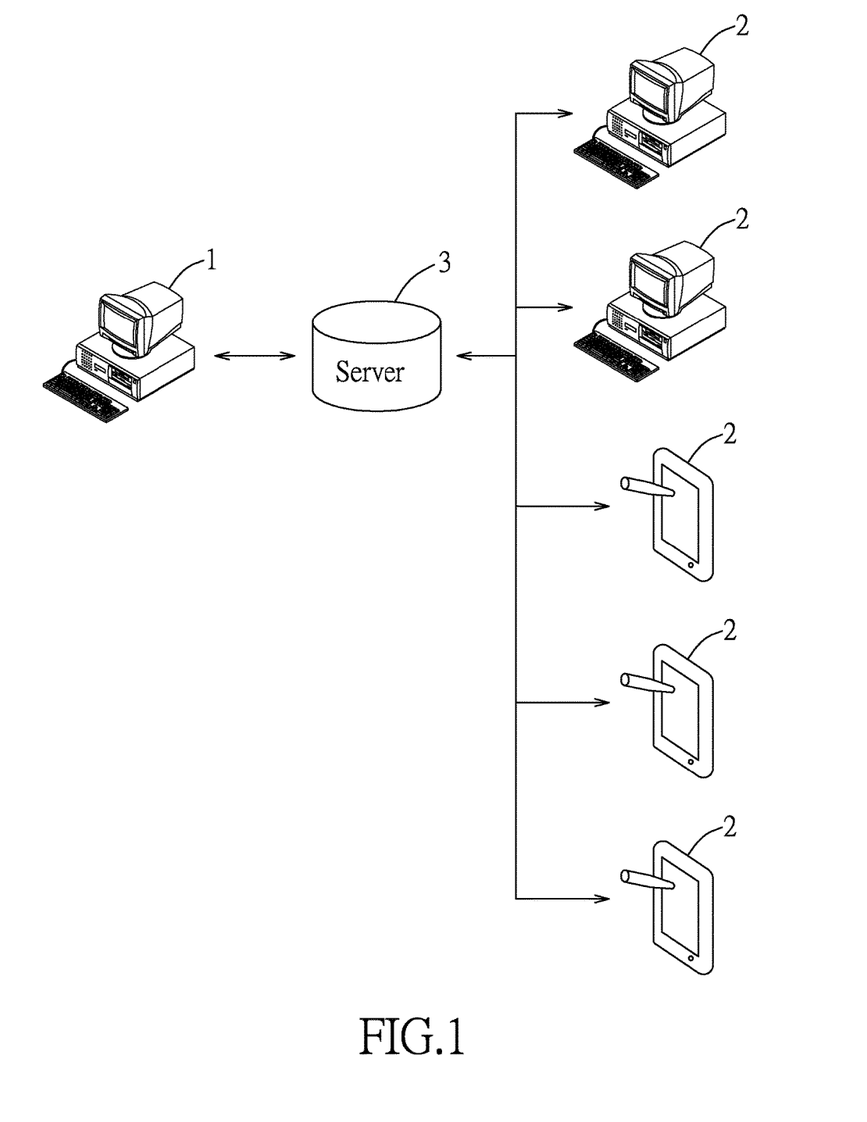
FIG. 1 is a schematic diagram illustrating an embodiment of a system for synchronous display of operating information according to the present invention.
Figure 2:
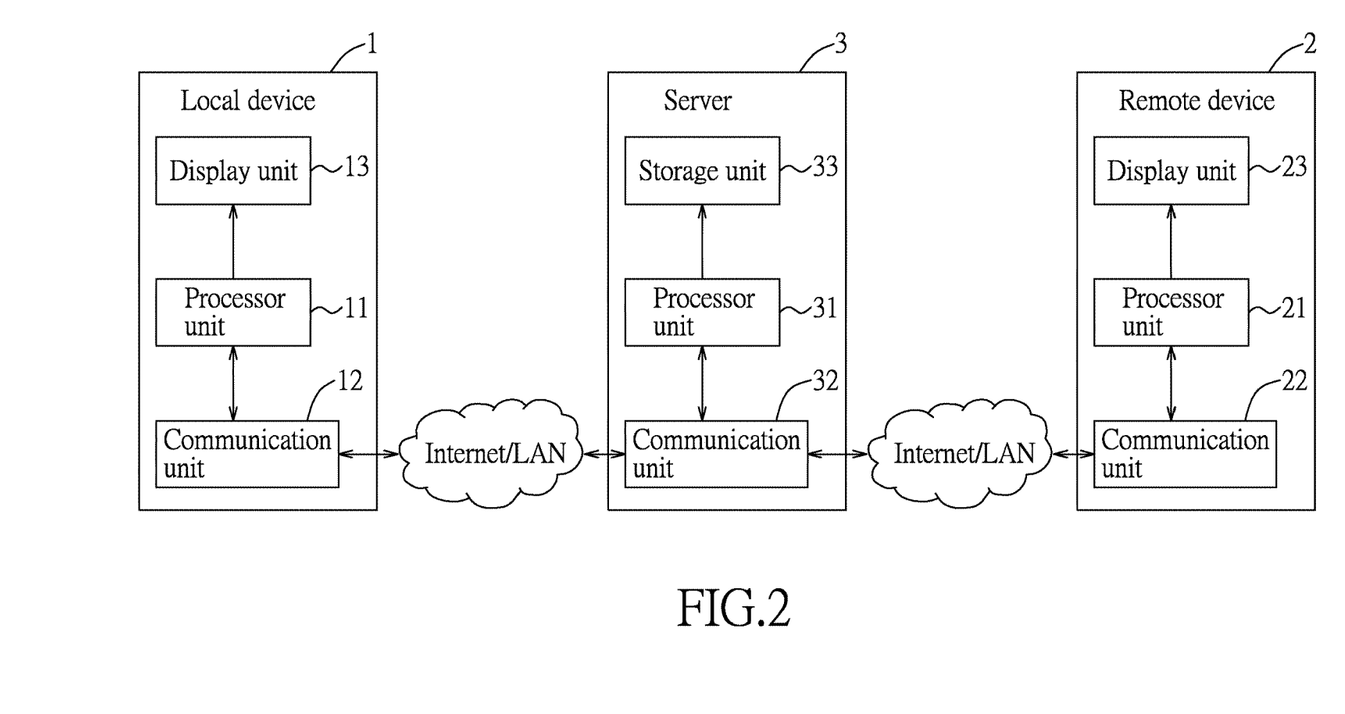
FIG. 2 is a block diagram illustrating an embodiment of a first electronic device, a server and a second electronic device of the system shown in FIG. 1.

Referring to FIG. 1 and FIG. 2, an embodiment of a method for synchronous display of operating information according to the present invention is to be implemented by a server 3 communicatively coupled to a first electronic device 1 (i.e., a local device 1) and to at least one second electronic device 2 (i.e., a remote device 2), via the Internet or local area network, such that image contents displayed on the local device 1 may be shared with the remote device 2 in real time. The local device 1 refers to an electronic device that provides the image contents, and the remote device 2 refers to another electronic device that receives the image contents. The aforementioned electronic devices are electronic equipments provided with network connection capabilities, such as personal computers, notebook computers, tablet computers, smart phones, etc. Each of the local device 1 and the remote device 2 includes a display unit 13 or 23, a processor unit 11 or 21, and a communication unit 12 or 22. The server 3 includes a storage unit 33, a processor unit 31, and a communication unit 32.

Figure 3:
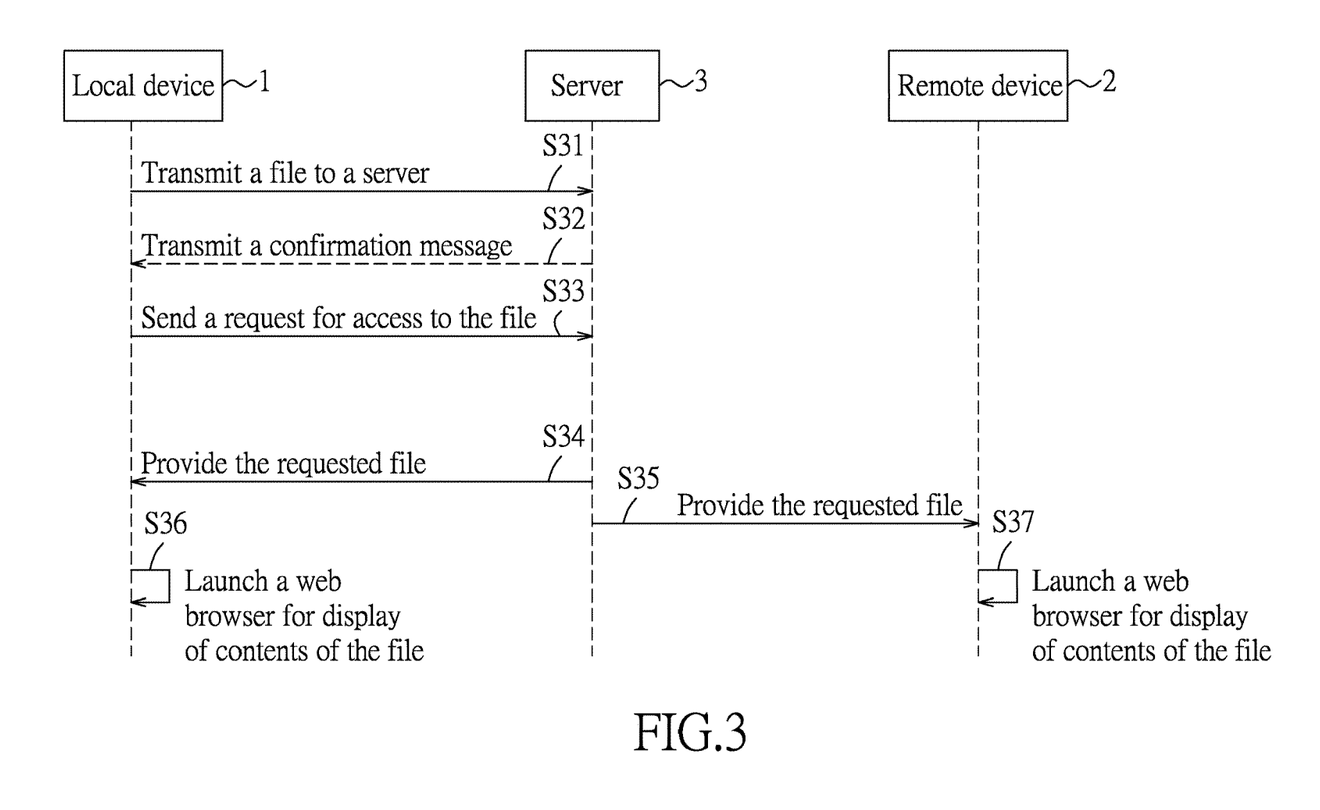
FIG. 3 is a partial flow chart illustrating an embodiment of a method for synchronous display of operating information according to the present invention.

Referring to FIG. 3, a partial flow chart of an embodiment of a method for synchronous display of operating information according to the present invention is illustrated. In this embodiment, prior to sharing the image contents, in step S31, the processor unit 11 of the local device 1 is configured to convert at least one source file that is desired to be shared, such as a Word file, a PowerPoint file, a PDF file, a Visio file, an Excel file, etc., into a webpage file (for example, a .html file or a .asp file). The processor unit 11 subsequently transmits the webpage file via the communication unit 12 to the server 3 for storage in the server 3.

In step S32, after the communication unit 32 of the server 3 receives the webpage file and after the processor unit 31 stores the webpage file in the storage unit 33, the communication unit 32 transmits a confirmation message to the local device 1.

It is noted that before proceeding to the following steps associated with sharing operating information, the local device 1 and the remote device 2 are first required to establish communication with the server 3 by virtue of login processes, so that the server 3 is able to recognize the local device 1 and the remote device 2 and is able to create a session therewith. Since operations associated with the login processes and creation of sessions are readily appreciated by a skilled person in the relevant art, detailed descriptions of the same are omitted herein for the sake of brevity.

In step S33, the local device 1 is configured to send, via the communication unit 13 of the local device 1, a request to the server 3 for access to a file stored in the server 3. In this embodiment, the webpage file received and stored in step S32 serves as the file stored in the server 3 and is to be requested by the local device 1.

In step S34, once the server 3 receives the request from the local device 1, the processor unit 31 of the server 3 retrieves the file (i.e., the webpage file), which is requested by the local device 1, from the storage unit 33, and provides the file to the local device 1 via the communication unit 32 of the server 3.

In step S35, the processor unit 31 of the server 3 further provides the file requested by the local device 1 to the remote device 2. Preferably, in this step, in response to receipt of the request from the local device 1, the server 3 is configured to actively transmit the file to the remote device 2 that is communicatively coupled to the server 3. Alternatively, in a variation of this step, the server 3 is configured to transmit the file to one or more remote devices 2 designated by the local device 1. It is noted that said one or more remote devices 2 are designated by the local device 1 when the local device 1 sends the request to the server 3 for access to the file stored in the server 3. Furthermore, the server 3 may provide a web address (e.g., a uniform resource locator, URL) corresponding to the webpage file to the local device 1 and the remote device 2, such that the local device 1 and the remote device 2 may download the webpage file according to the web address.

Figure 4:
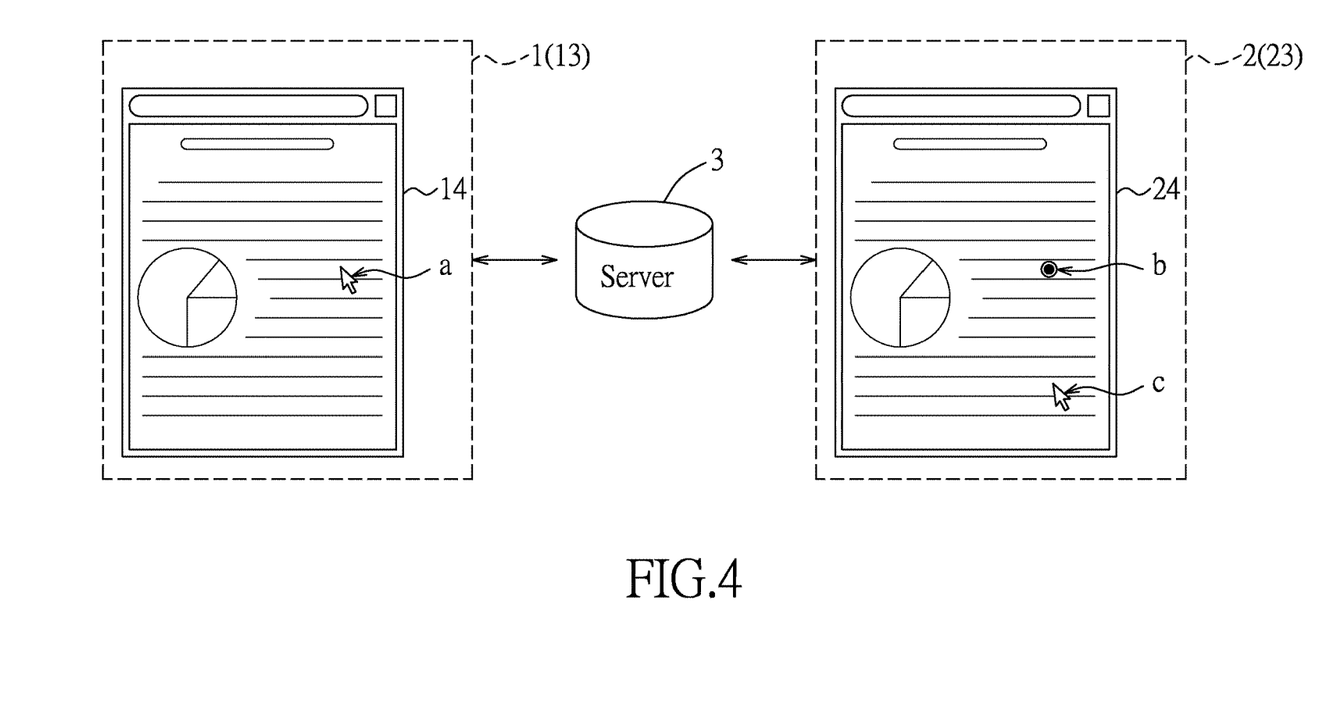
FIG. 4 illustrates that contents of the same file and corresponding operating information are displayed on each of the first and second electronic devices in a form of a web page.

As a result, in steps S36 and S37, when each of the communication units 12 and 22 of a respective one of the local device 1 and the remote device 2 receives the file from the server 3, each of the processor units 11 and 21 displays contents of the file on a corresponding one of the display units 13 and 23 in a form of a web page using a web browser (e.g., Internet Explorer, Firefox, Safari, Opera, etc.) launched automatically by the respective processor unit 11 or 21. Referring to FIG. 4, contents of the file are displayed in a form of web pages 14 and 24 on the display units 13 and 23, respectively.

Figure 5:
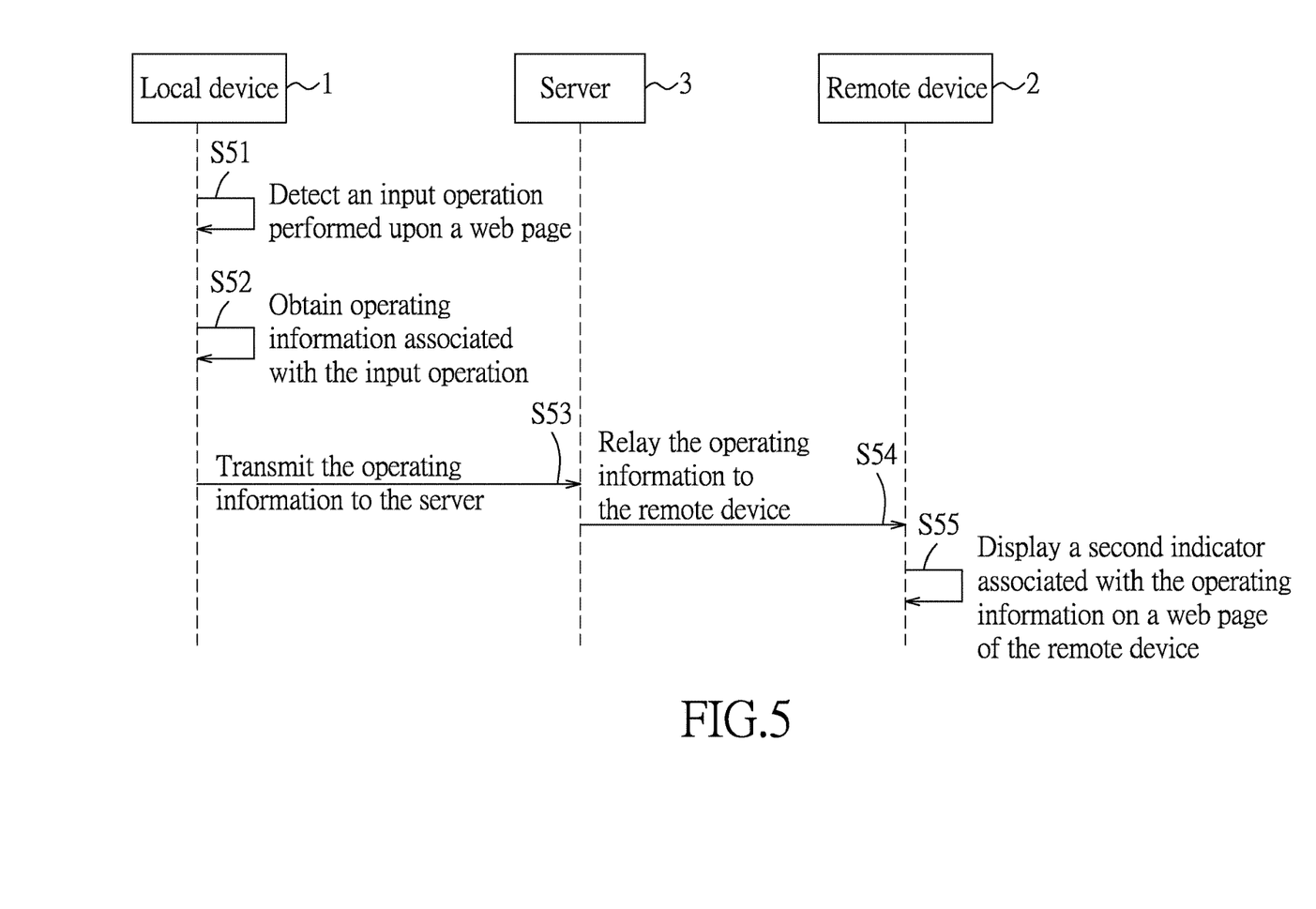
FIG. 5 is another partial flowchart illustrating the preferred embodiment of a method for synchronous display of operating information according to the present invention.
Figure 6:
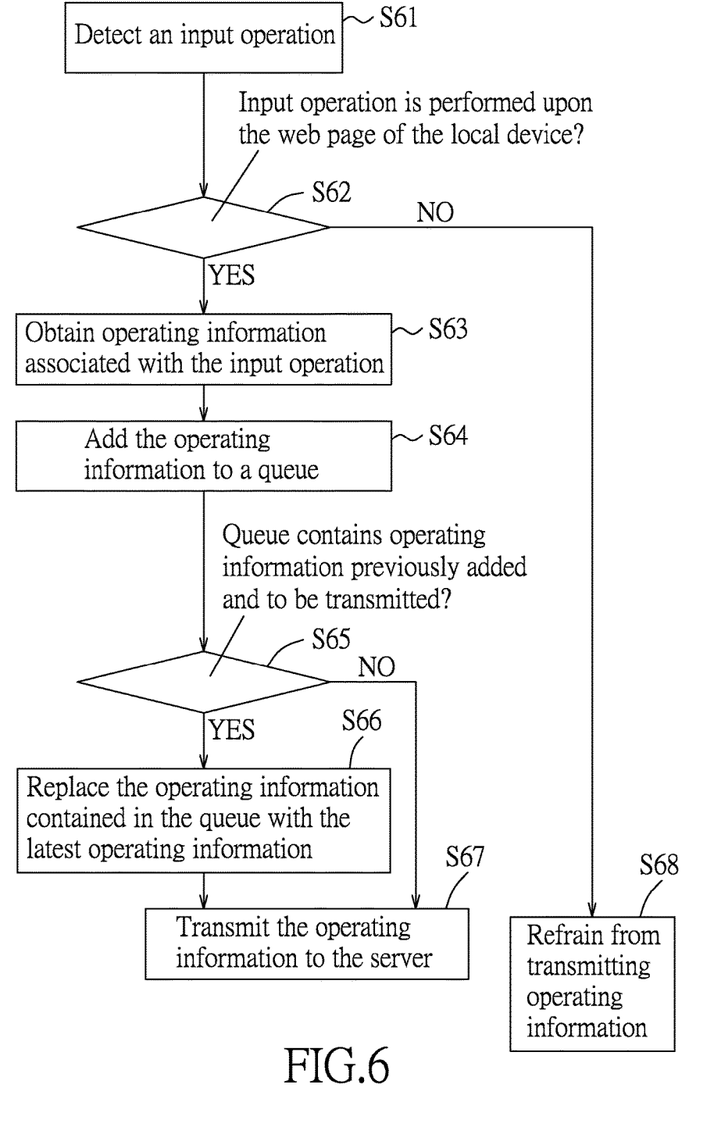
FIG. 6 is a flow chart illustrating an embodiment of the first electronic device which obtains and transmits the operating information associated with an input operation performed upon the web page of the first electronic device.

Referring to FIG. 5 and FIG. 6, in step S51 or steps S61 and S62, the processor unit 11 of the local device 1 is configured to detect whether an input operation which is inputted via an input device (not shown), such as a computer mouse or a touchpad, is performed upon the web page 14 of the contents of the file displayed by the web browser of the local device 1 (see FIG. 4). For example, click operations of the input device or movements of a first indicator (a), which may be an arrow symbol or other symbols representing a cursor and which echoes movements of the input device, are detected for the purpose of generating the operating information.

If a result of the determination made in step S62 is affirmative, in step S52 of FIG. 5 or steps S63 and S64 of FIG. 6, the processor unit 11 of the local device 1 is configured to obtain the operating information that is associated with the input operation performed upon the web page 14 of the contents of the file, and to add the operating information to a queue which is associated with operating information to be transmitted.

In step S65 of FIG. 6, the processor unit 11 of the local device 1 is configured to determine whether the queue contains any operating information that is previously added and that is to be transmitted. When the processor unit 11 determines that the queue already contains operating information that is to be transmitted, the flow proceeds to step S66. Otherwise, the flow goes to step S67 directly.

In step S66, the processor unit 11 of the local device 1 is configured to replace the operating information that is to be transmitted and that is previously added to the queue with the latest operating information (i.e., the last operating information added to the queue).

In step S53 of FIG. 5 or step S67 of FIG. 6, the processor unit 11 of the local device 1 is configured to transmit, via the communication unit 12 of the local device 1, the operating information contained in the queue to the server 3.

If the result of the determination made in step S62 is negative, the flow proceeds to step S68, in which the processor unit 11 of the local device 1 refrains from transmitting operating information to the server 3.

It is noted that the aforementioned operating information includes a file name of the file requested by the local device 1, and further includes at least one of coordinate information and gesture information in response to the input operation (i.e., conventional input operation, such as a click, a press and drag, etc.) performed upon the web page 14 of the contents of the file displayed by the web browser of the local device 1.

In step S54 of FIG. 5, when the communication unit 32 of the server 3 receives the operating information from the local device 1, the processor unit 31 of the server 3 immediately relays the operating information, via the communication unit 32 of the server 3, to the remote device 2 that is communicatively coupled to the server 3.

Figure 7:
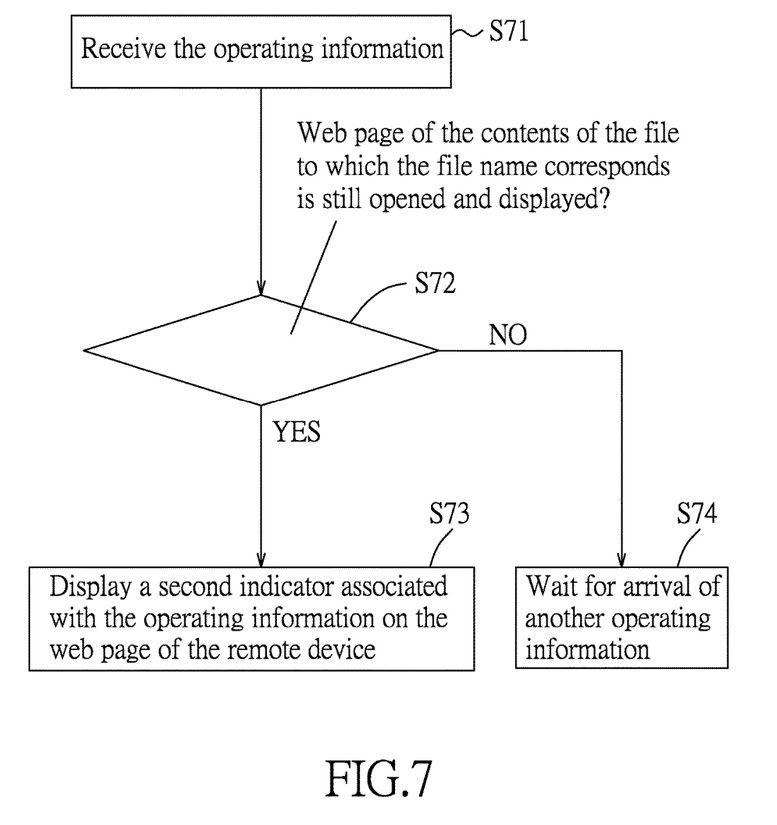
FIG. 7 is a flow chart illustrating an embodiment of the second electronic device which receives the operating information and displays an indicator associated with the operating information on the web page of the second electronic device.

Consequently, in step S71 of FIG. 7, the remote device 2 receives the operating information from the server 3. Thereafter, in step S72, the processor unit 21 of the remote device 2 is configured to determine, according to the file name included in the operating information, whether the web page 24 of the contents of the file to which the file name corresponds is still opened and displayed on the display unit 23 of the remote device 2.

In step S55 of FIG. 5 or step S73 of FIG. 7, when a result of the determination made in step S72 is affirmative, the processor unit 21 of the remote device 2, according to the operating information received from the server 3, is configured to display a second indicator (b) associated with the operating information on the web page 24 of the contents of the file displayed by the web browser of the remote device 2. Referring to FIG. 4, a position of the second indicator (b) corresponds to that of the first indicator (a) displayed on the local device 1. When the result of the determination made in step S72 is negative, in step S74, the processor unit 21 of the remote device 2 waits for arrival of another operating information.

In this way, when the input device of the local device 1 is operated to control movement of the first indicator (a) on the web page 14 of the contents of the file displayed by the web browser of the local device 1 for a purpose of explanation of the contents of the file, the second indicator (b) on the web page 24 of the contents of the file displayed by the web browser of the remote device 2 is moved synchronously. A user of the remote device 2, by means of observing the movement or status of the second indicator (b), may clearly understand a paragraph or a position of the contents of the file which is being discussed on the side of the local device 1, and the input operation performed upon the contents of the file, such as a click or a press and drag, etc.

Moreover, since the aforementioned operating information provided by the local device 1 is transmitted to the server 3 and is relayed by the server 3 to the remote device 2 via the Internet, whereas operating information associated with a third indicator (c) that corresponds to an input device (not shown) electrically coupled to the remote device 2 is obtained by means of an operating system of the remote device 2 so as to be displayed on the web page 24, the operating system of the remote device 2, based on different sources of the operating information, may correctly distinguish between and display the second indicator (b) and the third indicator (c). Therefore, the input device electrically coupled to the remote device 2 may be operated so as to control the third indicator (c) displayed on the display unit 23 of the remote device 2 without interference from the operating information from the local device 1.

Furthermore, since the server 3 provides the file which is requested (or selected) by the local device 1 in the form of a webpage file to each of the local device 1 and the remote device 2 for display on the respective web browser thereof, merely the contents of the file (i.e., web page contents)

which is shared by the local device 1 are displayed on the remote device 2 without revealing whole contents of the display screen of the local device 1. In addition, since a web browser is utilized for display of the contents of the file, the web browser of the remote device 2 may open a plurality of web pages for displaying contents of different files shared by other local devices 1 at the same time. Each of the web pages is configured to display synchronously a second indicator (b) corresponding to operating information that is provided by a respective one of distinct local devices 1 and that is relayed by the server 3.

To sum up, in the embodiment of the present invention, a web browser launched by an electronic device is utilized. The server 3 provides the file in a form of a webpage file that is requested by the local device 1 to each of the local device 1 and the remote device 2 with which the local device 1 intends to share the file (i.e., the remote device 2 designated by the local device 1), such that the contents of the webpage file are displayed on each of the local device 1 and the remote device 2 in a form of a web page using a respective web browser launched by each of the local device 1 and the remote device 2. In this way, when the local device 1 shares the file with the remote device 2, only the contents of the file, instead of the whole contents displayed on the display screen of the local device 1, are displayed on the remote device 2. Moreover, the remote device 2 may display contents of different files by opening distinct web pages at the same time as well as show corresponding indicators associated with operating information on the respective web pages.

While the present invention has been described in connection with what is considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method for synchronous display of operating information, the method to be implemented by a server communicatively coupled to a first electronic device and to at least one second electronic device, the method comprising:
   (A) receiving, by the server, a request from the first electronic device for access to a file stored in the server;
   (B) transmitting, by the server, the file which is requested by the first electronic device to each of the first electronic device and said at least one second electronic device, wherein contents of the file are displayed on each of the first and second electronic devices in a form of a single web page using a respective web browser launched by each of the first and second electronic devices;
   (C0) obtaining, by the first electronic device, operating information comprising a coordinate information, a gesture information and a file name of the file requested by the first electronic device, wherein the coordinate information and the gesture information are associated with an input operation performed upon the single web page of the contents of the file displayed by the web browser of the first electronic device;
   (C01) adding, by the first electronic device, the operating information to a queue which is associated with operating information to be transmitted, and determining, by the first electronic device, whether the queue contains previously-added operating information, wherein the queue is stored in the first electronic device;
   (C011) in response to the queue containing the previously-added operating information, replacing, by the first electronic device, the previously-added operation information with latest operating information, and transmitting, by the first electronic device, the latest operating information in the queue to the server, wherein the latest operating information is last operating information added to the queue;
   (C012) in response to the queue containing no previously-added operating information, transmitting, by the first electronic device, the operating information in the queue to the server;
   (C) receiving, by the server, from the first electronic device, the operating information in the queue; and
   (D) relaying, by the server, the operating information received from the first electronic device to said at least one second electronic device, the operating information configuring the second electronic device to display an indicator associated with the operating information on the single web page of the contents of the file displayed by the web browser of the second electronic device.

2. The method according to claim 1, further comprising, prior to step (A), the step of:
   converting, by the first electronic device, a source file into a webpage file, and transmitting the webpage file to the server for storage in the server, the webpage file serving as the file stored in the server and to be requested by the first electronic device.

3. The method according to claim 1, wherein, in step (B), the server is configured to transmit the file to said at least one second electronic device designated by the first electronic device.

4. The method according to claim 1, wherein, in step (B), in response to receipt of the request from the first electronic device, the server is configured to actively transmit the file to said at least one second electronic device that is communicatively coupled to the server.

5. A system for synchronous display of operating information, said system comprising:
   a first electronic device;
   at least one second electronic device; and
   a server which is communicatively coupled to said first and second electronic devices;
   wherein said first electronic device is configured to:
   obtain operating information comprising a coordinate information, a gesture information and a file name of a file requested by said first electronic device, wherein the coordinate information and the gesture information are associated with an input operation performed upon the webpage of the contents of the file displayed by the web browser,
   add the operating information to a queue which is associated with operating information to be transmitted, and determine whether the queue contains previously-added operating information, wherein the queue is stored in the first electronic device,
   in response to the queue containing the previously-added operating information, replace the previously-added operation information with latest operating information and transmit the latest operating information in the queue to the server, wherein the latest operating information is last operating information added to the queue,
   in response to the queue containing no previously-added operating information, transmit the operating information in the queue to the server, and
   wherein said server is configured to:
   receive a request from said first electronic device for access to the file stored in said server, transmit the file which is requested by said first electronic device to each of said first electronic device and said at least one second electronic device, wherein contents of the file are displayed on each of said first and second electronic devices in a form of a single web page using a respective web browser launched by each of said first and second electronic devices, receive from said first electronic device the operating information in the queue, and relay the operating information received from said first electronic device to said at least one second electronic device; and wherein the operating information configures said second electronic device to display an indicator associated with the operating information on the single web page of the contents of the file displayed by the web browser of said second electronic device.

6. The system according to claim 5, wherein said first electronic device is configured to convert a source file into a webpage file, and to transmit the webpage file to said server for storage in said server, the webpage file serving as the file stored in said server and to be requested by said first electronic device.

7. The system according to claim 5, wherein said server is configured to transmit the file to said at least one second electronic device designated by said first electronic device.

8. The system according to claim 5, wherein, in response to receipt of the request from said first electronic device, said server is configured to actively transmit the file to said at least one second electronic device that is communicatively coupled to said server.

9. An electronic device for enabling synchronous display of operating information of said electronic device, via a server, on a remote electronic device communicatively coupled to the server, said electronic device comprising:
- a communication unit configured to establish communication with the server;
- a display unit; and
- a processor unit configured to send, via said communication unit, a request to the server for access to a file stored in the server, to receive the file which is requested by said electronic device from the server, to display contents of the file on said display unit in a form of a single web page using a web browser launched by said processor unit, and to enable the server to transmit the file to the remote electronic device such that the contents of the file are displayed on the remote electronic device in a form of a single web page using a web browser launched by the remote electronic device; and wherein said processor unit obtains operating information comprising a coordinate information, a gesture information and a file name of the file requested by the first electronic device, the coordinate information and the gesture information being associated with an input operation performed upon the single web page of the contents of the file displayed by the web browser of the electronic device, adds the operating information to a queue which is associated with operating information to be transmitted, and transmits the operating information in the queue via said communication unit to the server such that the operating information is relayed by the server to the remote electronic device, and such that the remote electronic device, the operating information configuring the remote electronic device to display an indicator associated with the operating information on the single web page of the contents of the file displayed by the web browser of the remote electronic device, wherein the queue is stored in the electronic device, wherein after the operating information is added to the queue, the processor unit determines whether the queue contains previously-added operating information, wherein in response to the queue containing the previously-added operating information, the processor unit replaces the previously-added operation information with latest operating information transmits the operating information in the queue to the server, wherein the latest operating information is last operating information added to the queue, and wherein in response to the queue containing no previously-added operating information, the processor unit transmits the latest operating information in the queue to the server.

10. The electronic device according to claim 9, wherein, prior to sending the request to the server for access to the file stored in the server, said processor unit converts a source file into a webpage file, and transmits the webpage file via said communication unit to the server for storage in the server, the webpage file serving as the file stored in the server and to be requested by said electronic device.

11. The electronic device according to claim 9, wherein said processor unit enables the server to transmit the file to the remote electronic device designated by said electronic device.

12. An electronic device communicatively coupled to a server and comprising:
- a communication unit configured to establish communication with the server and to receive a file and operating information transmitted by the server,
  wherein the file is requested from a first electronic device communicatively coupled to the server,
  wherein the operating information comprises a coordinate information, a gesture information and a file name of the file requested by the first electronic device, and the coordinate information and the gesture information are associated with an input operation performed upon the single web page of the contents of the file displayed by the web browser of the first electronic device,
  wherein the first electronic device adds the operating information to a queue which is associated with operating information to be transmitted, and determine whether the queue contains previously-added operating information, replaces the previously-added operation information with the latest operating information and transmit the operating information in the queue to the server in response to the queue containing the previously-added operating information, and transmits the latest operating information in the queue to the server in response to the queue containing no previously-added operating information, wherein the queue is stored in the first electronic device, and wherein the latest operating information is last operating information added to the queue;
- a display unit; and
- a processor unit configured to display contents of the file on said display unit in a form of a single web page using a web browser launched by said processor unit, and to display an indicator associated with the operating information on the single web page of the contents of the file displayed by the web browser of the electronic device.

13. A server communicatively coupled to a first electronic device and to at least one second electronic device, said server comprising:
- a storage unit configured to store at least one file;

a communication unit configured to establish communication with the first electronic device and said at least one second electronic device; and a processor unit configured to receive a request from the first electronic device for access to the file stored in said storage unit, transmit, via said communication unit, the file which is requested by the first electronic device to each of the first electronic device and said at least one second electronic device, contents of the file being displayed on each of the first and second electronic devices in a form of a single web page using a respective web browser launched by each of the first and second electronic devices, wherein said first electronic device obtains operating information comprising a coordinate information, a gesture information and a file name of the file requested by the first electronic device, the coordinate information and the gesture information being associated with an input operation performed upon the single web page of the contents of the file displayed by the web browser, adds the operating information to a queue which is associated with operating information to be transmitted, determines whether the queue contains previously-added operating information, replaces the previously-added operation information with latest operating information and transmit the operating information in the queue to the server in response to the queue containing the previously-added operating information, and transmits the latest operating information in the queue to the server in response to the queue containing no previously-added operating information, wherein the queue is stored in said first electronic device, and wherein the latest operating information is last operating information added to the queue, receive, from the first electronic device, the operating information in the queue, and relay the operating information received from the first electronic device to said at least one second electronic device, the operating information configuring the second electronic device to display an indicator associated with the operating information on the single web page of the contents of the file displayed by the web browser of the second electronic device.

14. The server according to claim 13, wherein the server receives from the first electronic device a webpage file converted from a source file, and stores the webpage file in said storage unit, the webpage file stored in said storage unit serving as the file to be requested by the first electronic device.

15. The server according to claim 13, wherein said processor unit is configured to transmit the file to said at least one second electronic device designated by the first electronic device.

16. The method according to claim 1, further comprising, after step (D), the step of:

receiving, by the second electronic device, the operating information from the server;

determining, by the second electronic device, whether the single web page of the contents of the file to which the file name corresponds is still opened and displayed on the second electronic device according to the file name included in the operating information;

in response to the single web page of the contents of the file determined to be still opened and displayed on the second electronic device, displaying, by the second electronic device, the indicator associated with the operating information on the single web page of the second electronic device; and in response to the single web page of the contents of the file determined to be not opened and not displayed on the second electronic device, waiting, by the second electronic device, for arrival of another operating information.

17. The method according to claim 16, further comprising, the step of:

displaying, by the second electronic device, another indicator associated with operating information of the second electronic device on the webpage of the second electronic device.

\* \* \* \* \*